United States Patent [19]

Ohgoda

[11] Patent Number: 4,870,285
[45] Date of Patent: Sep. 26, 1989

[54] CASSETTE FOR INFORMATION RECORDING MEDIUMS

[75] Inventor: Makoto Ohgoda, Kanagawa, Japan

[73] Assignee: Fuji Photo Film Co., Ltd., Kanagawa, Japan

[21] Appl. No.: 182,686

[22] Filed: Apr. 18, 1988

[30] Foreign Application Priority Data

Apr. 16, 1987 [JP] Japan ............................ 62-93862
Apr. 16, 1987 [JP] Japan ............................ 62-93863

[51] Int. Cl.[4] .................................. G03B 42/04
[52] U.S. Cl. .......................... 250/484.1; 250/327.2; 271/127; 378/182
[58] Field of Search ............ 250/327.2 A, 484.18; 378/182, 188; 354/276, 212; 271/127

[56] References Cited

U.S. PATENT DOCUMENTS 3,989,236 11/1976 Komori et al. ............... 271/127
4,498,005 2/1985 Oono et al. .................. 250/327.2
4,765,605 8/1988 Abbott ......................... 271/147

FOREIGN PATENT DOCUMENTS

55-33140 3/1980 Japan ........................... 378/182
55-123827 9/1980 Japan ........................... 271/127

Primary Examiner—Constantine Hannaher
Attorney, Agent, or Firm—Sughrue, Mion, Zinn, Macpeak & Seas

[57] ABSTRACT

A cassette for storing an image recording medium includes a casing for housing the image recording medium therein, and a cover openably and closably mounted on the casing for holding the image recording medium in a light-shielding manner in the casing. A resilient member such as a leaf spring or a sponge body is disposed in the casing for placing the image recording medium thereon. Alternatively, a lifter is operatively coupled between the cover and the casing for placing the image recording medium thereon. When the cover is opened in a device having a sheet feed system, the image recording medium can be brought by the resilient member or the lifter into a position facing the sheet feed system and then fed out of the casing by the sheet feed system.

16 Claims, 7 Drawing Sheets

CASSETTE FOR INFORMATION RECORDING MEDIUMS

BACKGROUND OF THE INVENTION

The present invention relates to a cassette for storing an information recording medium, and more particularly to a cassette comprising a casing for holding therein an information recording medium such as a stimulable phosphor sheet or the like in a light-shielding fashion and a cover openably and closably hinged to the casing, the cassette being arranged to deliver the information recording medium easily into a transport system when the cover is opened in an image reading device.

There has recently been developed and widely used, particularly in the medical field, a radiation image recording and reproducing system for producing the radiation-transmitted image of an object using a stimulable phosphor material capable of emitting light upon exposure to stimulating rays. When a certain phosphor is exposed to a radiation such as X-rays, $\alpha$-rays, $\beta$-rays, $\gamma$-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The radiation image recording and reproducing system includes an image reading device for reading the radiation image recorded on a stimulable phosphor sheet. The image reading device reads the radiation image as follows:

The stimulable phosphor sheet is two-dimensionally scanned by a light beam such as a laser beam, and light emitted from the stimuable phosphor sheet in response to application of the light beam is detected in time series by a light detector such as a photomultiplier or the like, for thereby obtaining image information. The two-dimensional scanning of the stimulable phosphor sheet with the light beam is effected by mechanially feeding the stimulable phosphor sheet in one direction for auxiliary scanning, while deflecting the light beam for main scanning in a direction normal to the direction in which the stimulable phosphor sheet is fed.

For recording an image on a stimulable phoshpor sheet in an image recording device, an object to be imaged is exposed to radiation, and the stimulable phosphor sheet stored in a cassette is then exposed to the radiation having passed through the object for recording the radiation image on the stimulable phosphor sheet. The stimulable phosphor sheet as it is carried in the cassette is then loaded into the image reading device, in which the stimulable phosphor sheet is taken out of the cassette by a sheet feed mechanism including a suction cup and delivered to a position where the sheet is scanned by the light beam.

The sheet feed mechanism includes a vacuum generator for enabling the suction cup to attract and take a stimulable phosphor sheet out of the cassette. For reliable delivery of the stimulable phosphor sheet from the cassette, the suction cup should be displaced along a desired path by means of links or the like. Therefore, the sheet feed mechanism is complex in structure, large in size, and costly to manufacture. Since the image reading device must be equipped with such a sheet feed mechanism, the image reading device is also large in size and its cost of manufacture is high.

There is also known a system in which the radiation image of an object is recorded on a conventional X-ray film. The X-ray film to which the desired radiation image has been exposed is also stored in a cassette which is then loaded into an automatic developing device or the like. In the automatic developing device, the X-ray film is subsequently taken out of the cassette. The X-ray film cassette causes the same problems as those described above with respect to the cassette for storing stimulable phosphor sheets.

SUMMARY OF THE INVENTION

It is a general object of the present invention to provide a cassette having a cover openably and closably hinged to a casing for holding therein an information recording medium such as a stimulable phosphor sheet or the like in a light-shielding fashion, the cassette being arranged to deliver the information recording medium forcibly into a transport system when the cover is opened in a device such as an image recording device, without requiring any complex sheet feed mechanism in the device, so that the image recording medium can easily and reliably be taken out through a simple structure, and the device itself is simple in construction and can be manufactured less costly.

Another object of the present invention is to provide a cassette for storing an image recording medium, comprising a casing for housing the image recording medium therein, a cover openably and closably mounted on the casing for holding the image recording medium in a light-shielding manner in the casing, and a resilient member disposed in the casing for placing the image recording medium thereon, the arrangement being such that when the cover is opened in a device having a sheet feed system, the image recording medium can be brought under resiliency of the resilient member into a position facing the sheet feed system and then fed out of the casing by the sheet feed system.

Still another object of the present invention is to provide a cassette for storing an image recording medium, wherein the cover has lock means detachably engageable with the casing for locking the cover on the casing.

Yet another object of the present invention is to provide a cassette for storing an image recording medium, wherein the resilient member comprises a leaf spring having a curved or bent portion directed toward the cover.

Yet still another object of the present invention is to provide a cassette for storing an image recording medium, wherein the curved or bent portion of the leaf spring is positioned near a portion of the casing from which the image recording member will be fed out of the casing.

A further object of the present invention is to provide a cassette for storing an image recording medium, wherein the resilient member comprises a resilient sponge body.

A still further object of the present invention is to provide a cassette for storing an image recording medium, wherein the resilient sponge body has an end projecting toward the cover and positioned near a portion of the casing from which the image recording member will be fed out of the casing.

A yet further object of the present invention is to provide a cassette for storing an image recording medium, comprising a casing for housing the image recording medium therein, a cover openably and closably mounted on the casing for holding the image recording medium in a light-shielding manner in the casing, and a lifter disposed in the casing for placing the image recording medium thereon, the lifter being operatively coupled to the cover by coupling means, the arrangement being such that when the cover is opened in a device having a sheet feed system, the lifter is displaced from the casing through the coupling means to bring the image recording medium on the lifter into a position facing the sheet feed system by which the image recording medium can be fed out of the casing.

A yet still further object of the present invention is to provide a cassette for storing an image recording medium, wherein the cover has lock means detachably engageable with the casing for locking the cover on the casing.

It is also an object of the present invention to provide a cassette for storing an image recording medium, wherein the coupling means comprises a pair of pivotally connected links, one of the links being joined to the cover and the other link to the lifter.

Another object of the present invention is to provide a cassette for storing an image recording medium, wherein the links are angularly spaced an angle smaller than 180° from each other when the links are angularly moved away from each other.

Still another object of the present invention is to provide a cassette for storing an image recording medium, wherein the lifter is spaced from a portion of the casing from which the image recording member will be fed out of the casing, whereby when the lifter is displaced from the casing by opening the cover, an end of the image recording medium on the lifter projects outwardly from the lifter so as to face the sheet feed system.

Yet another object of the present invention is to provide a cassette for storing an image recording medium, wherein the casing has a recess defined in an inner surface thereof near a portion of the casing from which the image recording member will be fed out of the casing, the recess extending transversely to a direction in which the image recording member will be fed out of the casing, the lifter being fittable in the recess when the cover is closed.

Yet still another object of the present invention is to provide a cassette for storing an image recording medium, wherein the lifter and the inner surface of the casing lie flush with each other when the lifter is fitted in the recess.

A further object of the present invention is to provide a cassette for storing an image recording medium, wherein the lifter has opposite edges extending transversely of the direction and slanted progressively toward each other in a direction away from the cover.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
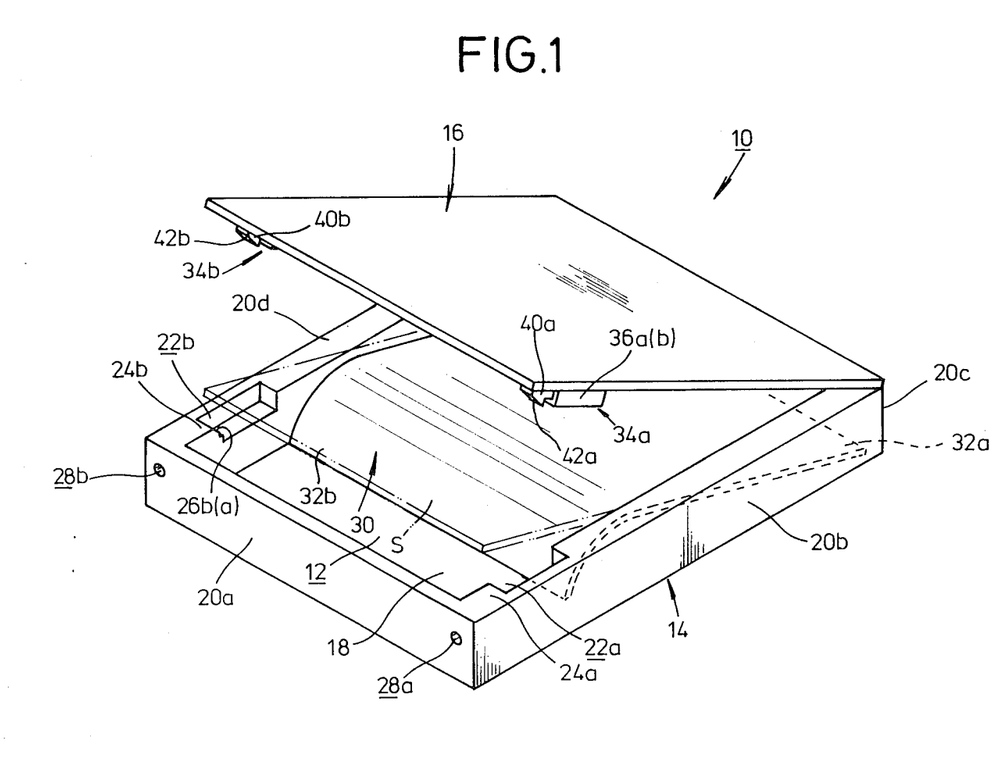
FIG. 1 is a perspective view of a cassette for an information recording medium according to an embodiment of the present invention.

FIG. 1 shows a cassette 10 for storing an information recording medium such as a stimulable phosphor sheet S, the cassette 10 comprising a casing 14 defining a chamber 12 for storing the stimulable posphor sheet S therein and an openable and closable cover 16 for holding the stimulable phosphor sheet S in a light-shielding manner.

Figure 2:
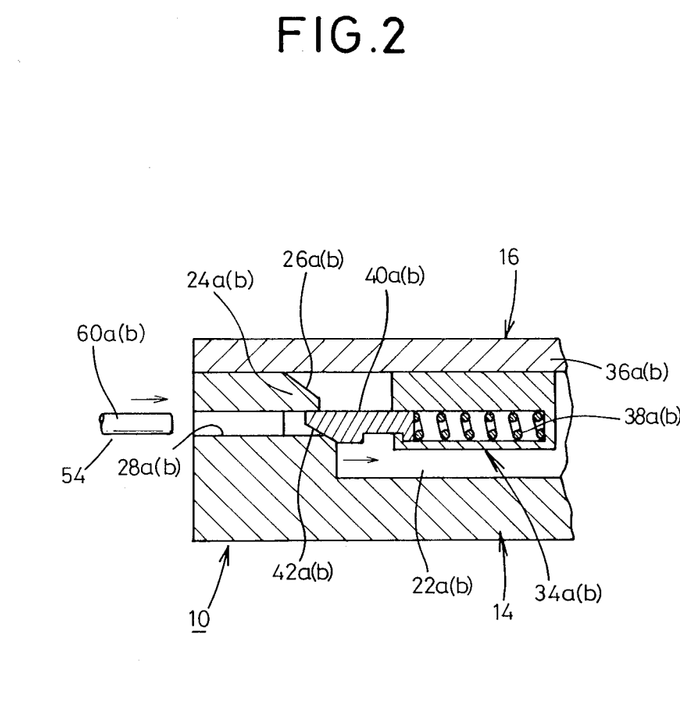
FIG. 2 is an enlarged fragmentary vertical cross-sectional view of the cassette shown in FIG. 1.

The casing 14 comprises a rectangular bottom wall 18 and side walls 20a through 20d vertically extending from the respective four sides of the bottom wall 18. The cover 16 is swingably hinged to one of the side walls 20c. The side walls 20b, 20d which extend perpendicularly to the side wall 20c have recesses 22a, 22b, respectively, defined in inner surfaces thereof near the side wall 20a. Ridges 24a, 24b project respectively into the recesses 22a, 22b and have slanted surfaces 26a, 26b, respectively, as shown in FIG. 2. The side wall 20a has a pair of holes 28a, 28b defined therein in communication with the respective recesses 22a, 22b.

A leaf spring 30 is disposed in the casing 14 in sliding contact with the inner surfaces of the side walls 20b, 20d. Since radiation is applied from the bottom wall 18 to the phosphor-coated side of the stimulable phosphor sheet S against which the leaf spring 30 is held, the leaf spring 30 should be made of a material permeable to radiation such as aluminum or resin material.

The leaf spring 30 has an end 32a attached to the bottom wall 18 near the side wall 20c and an opposite end 32b slidably held against the bottom wall 18 in spaced relation to the side wall 20a. The leaf spring 30 is of a curved shape convex toward the cover 16 with a portion close to the end 32b being at a highest position. Alternatively, the leaf spring 30 may be bent such that a portion close to the end 32b is directed toward the cover 16.

The cover 16 has a pair of lock means 34a, 34b which can be inserted respectively into the recesses 22a, 22b for locking the cover 16 on the casing 14.

As shown in FIG. 2, the lock means 34a includes a housing 36a mounted on the inner surface of the cover 16 and projecting toward the recess 22a in the casing 14, the housing 36a accommodating a coil spring 38a therein. A finger 40a has one end inserted in the housing 36a and engaging the spring 38a. The finger 40a is normally urged by the spring 38a to cause the other end thereof to project from an end face of the housing 36a, the other end of the finger 40a having a slanted surface 42a.

The other lock means 34b is identical in structure to the lock means 34a. The components of the lock means 34b which are identical to those of the lock means 34a are denoted by identical reference numerals with a suffix b.

Now, a radiation image information reading device in which the cassette 10 is loaded will be described with reference to FIG. 3.

The radiation image information reading device generally denoted at 50, has a cassette holder 52 positioned substantially in the center of the device for removably loading the cassette 10. The cassette holder 52 comprises an unlock means 54 for releasing the lock means 34a, 34b, and a cover opening/closing means including a suction cup 56 for selectively opening and closing the cover 16. The unlock means 54 comprises a pair of retainers 58a, 58b and a pair of presser pins 60a, 60b fitted respectively in the retainers 58a, 58b and slidably displaceable into the respective holes 28a, 28b in response to the operation of an actuator (not shown).

A feed roller pair 62 which is movable back and forth in the directions of the arrow is disposed in the vicinity of the cassette holder 52. A first feed means 66 including a feed belt 64 is positioned near the feed roller pair 62. The first feed means 66 is disposed above a first stacker 70 for temporarily storing a stimulable phosphor sheet S taken out of the cassette 10, the first stacker 70 having a plurality of sheet storage units or bins 68 each for storing one stimulable phosphor sheet S therein. The first stacker 70 is movable in the directions of the arrow A by a motor or the like (not shown). The stimulable phosphor sheet S stored in each sheet storage unit 68 is placed on a bottom plate (not shown) thereof. By turning this bottom plate downwardly, the stimulable phosphor sheet S can be fed to a feed belt 76 through a feed belt 74 serving as a second feed means 72 located downwardly of the first stacker 70. The feed belt 76 has an end positioned closely to an image reader 78.

The image reader 78 includes a third feed means 80 for feeding the stimulable phosphor sheet S in the direction of the arrow B (i.e., the auxiliary scanning direction) and a scanning means 82. The scanning means 82 includes a laser beam source 84 for emitting a laser beam 86 which is scanned over the stimulable phosphor sheet S by a mirror 88 and a galvanometer mirror 90. A reflecting mirror 92 is disposed above the third feed means 80 for collecting light emitted from the stimulable phosphor sheet S which is scanned by the laser beam 86 in the main scanning direction. A light guide 94 is disposed along the main scanning line above the position where the sheet S is scanned. A photomultiplier 96 is mounted on the upper end of the light guide 94.

The third feed means 80 comprises a feed belt 98 followed by a feed belt 100 including a horizontal portion and a vertical portion that is held in sliding contact with another feed belt 102 serving as a fourth feed means 104. A pair of feed belts 106a, 106b held in sliding contact with each other is positioned upwardly of the feed belt 100. Two roller pairs 108, 110 spaced from each other in the vertical direction are positioned above the feed belts 106a, 106b, with an erasure unit 112 located between the roller pairs 108, 110. The erasure unit 112 has a plurality of erasing light sources 114 such as sodium vapor lamps, tungsten lamps, or xenon lamps for erasing any radiation image remaining on the stimulable phosphor sheet S from which the radiation image has been read in the image reader 78.

The roller pair 110 is disposed below a fifth feed means 116 comprising a feed belt 118 including a horizontal upper portion and a vertical lower portion held in sliding contact with a short feed belt 120. The horizontal upper portion of the feed belt 118 is located adjacent to a sixth feed means 124 including a feed belt 122. The stimulable phosphor sheet S that has reached the sixth feed means 124 is angularly displaced 180° so as to be fed into a second stacker 126.

The second stacker 126 is of a structure identical to that of the first stacker 70. The second stacker 126 includes a plurality of sheet storage units or bins 128 and is movable in the directions of the arrow C by a motor or the like. The second stacker 126 is positioned above a roller pair 130 disposed near a seventh feed means 132 which feeds the stimulable phosphor sheet S supplied from the second stacker 126 to an auxiliary erasure unit 134 comprising an erasing light source 136. The stimulable phosphor sheet S that has passed through the auxiliary erasure unit 134 is stored into the cassette 10 by the roller pair 62.

The cassette 10 is loaded into the radiation image information reading device 50 as follows:

The stimulable phosphor sheet S is stored in the cassette 10 in a light-shielding condition, the sheet S storing or recording radiation image information of an object through exposure in an image recording device or the like. The leaf spring 30 held against the stimulable phosphor sheet S is pressed downwardly by the cover 16 to a lower height with the end 32b positioned near the side wall 20a as indicated by the two-dot-and-dash lines in FIG. 4.

Figure 3:
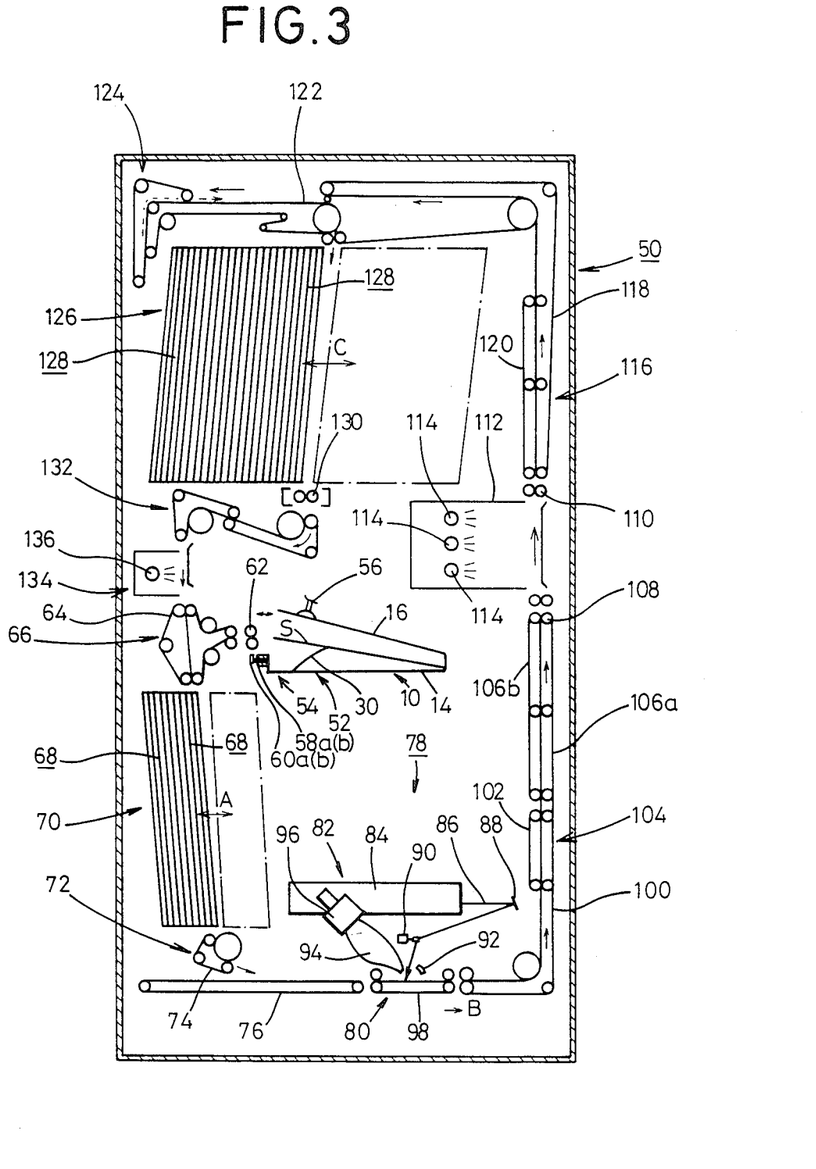
FIG. 3 is a schematic elevational view of a radiation image information reading device in which the cassette of the invention is loaded.

After the cassette 10 is loaded in the cassette holder 52 in the reading device 50 as shown in FIG. 3, the unlock means 54 is actuated to displace the presser pins 60a, 60b toward the cassette 10. The presser pins 60a, 60b enter the respective holes 28a, 28b in the casing 14 to push the fingers 40a, 40b in the direction of the arrow (FIG. 2) against the resiliency of the coil springs 38a, 38b until the fingers 40a, 40b disengage from the ridges 24a, 24b, whereupon the lock means 34a, 34b are released. The cover 16 is then lifted by the suction cup 56 of the cover opening/closing means, thus opening the cassette 10 in the reading device 50.

Figure 4:
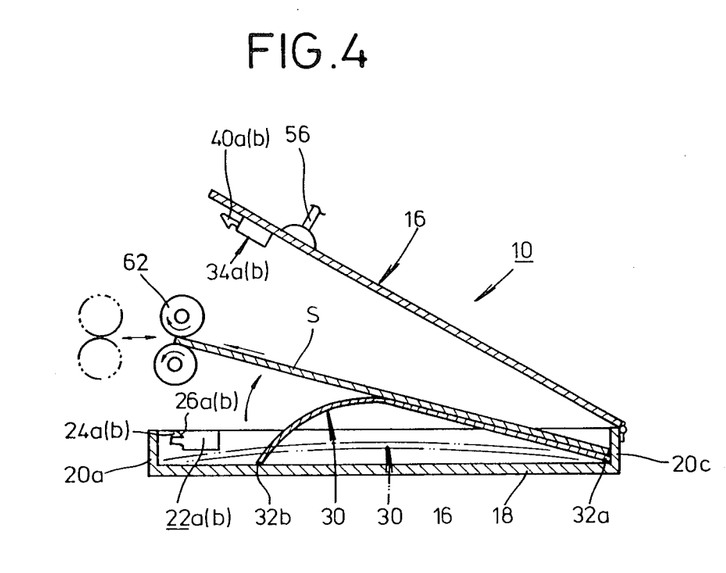
FIG. 4 is a vertical cross-sectional view showing the manner in which a sheet is taken out of the cassette.

Since the cover 16 is angularly displaced away from the casing 14, the leaf spring 30 which has been pressed downwardly by the cover 16 is resiliently released upwardly as indicated by the solid lines in FIG. 4. Since the leaf spring 30 is curved in its free state with its portion near the end 32b being at the highest position, the stimulable phosphor sheet S placed on the leaf spring 30 is obliquely lifted by the leaf spring 30 so that the end of the sheet S near the side wall 20a is positioned upwardly.

Then, the roller pair 62 is displaced toward the cassette 10 to grip the upper end of the stimulable phosphor sheet S. The rollers of the roller pair 62 are then rotated about their own axes in the directions of the arrow (FIG. 4) to feed the stimulable phosphor sheet S toward the first feed means 66. The stimulable phosphor sheet S is fed vertically downwardly by the first feed means 66 into one of the sheet storage units 68 of the firs stacker 70. The stimulable phosphor sheet S thus fed or a stimulable phosphor sheet S stored in another sheet storage unit 68 is then fed toward the second feed means 72. The stimulable phosphor sheet S is then fed toward the image reader 78 by the second feed means 72 and the feed belt 76.

The stimulable phosphor sheet S that has arrived at the image reader 78 is fed in the auxiliary scanning direction (indicated by the arrow B) by the feed belt 98 of the third feed means 80, and at the same time the scanning means 82 is energized. The laser beam 86 emitted from the laser beam source 84 is reflected by the mirror 88 to the galvanometer mirror 90, which is swung to scan the laser beam 86 over the sheet S. Light emitted from the sheet S upon exposure to the laser beam 86 is directly applied, or is reflected by the reflecting mirror 90, to the light guide 94, and then is converted by the photomultiplier 96 to an electric signal that is supplied to an image recording device or the like.

The stimulable phosphor sheet S from which the recorded radiation image has been read is fed to the roller pair 108 by the feed belt 100, the fourth feed means 104 including the feed belt 102, and the feed belts 106a, 106b, and then fed by the roller pair 108 into the erasure unit 112. In the erasure unit 112, the erasing light sources 114 are energized to apply light to the stimulable phosphor sheet S for erasing remaining radiation image therefrom. The stimulable phosphor sheet S which has left the erasure unit 112 is fed vertically upwardly by the feed belts 118, 120 of the fifth feed means 116, and then is directed horizontally to reach the sixth feed means 124. The stimulable phosphor sheet S is turned 180° in its direction of feed by the sixth feed means 124, and stored into one of the sheet storage units 128 of the second stacker 126.

The stimulable phosphor sheet S that has been taken out of the cassette 10 and stored in the sheet storage unit 128 is thereafter fed by the roller pair 130 to the seventh feed means 132, by which the sheet S is moved across the auxiliary erasure unit 134. The stimulable phosphor sheet S is subjected to secondary image erasure in the auxiliary erasure unit 134, after which the stimulable phosphor sheet S is fed to the roller pair 62.

The rollers of the roller pair 62 are rotated in the opposite directions to deliver the stimulable phosphor sheet S gripped thereby toward the cassette 10, so that the stimulable phosphor sheet S can reliably be fed into the cassette 10.

After the stimulable phosphor sheet S has been placed in the cassette 10, the roller pair 62 is moved away from the cassette 10, and the suction cup 56 is swung downwardly to close the cover 16. The slanted surfaces 42a, 42b of the fingers 40a, 40b of the lock means 34a, 34b are now brought into engagement with the respective slanted surfaces 26a, 26b of the ridges 24a, 24b. The fingers 60a, 60b are resiliently displaced into the housings 36a, 36b, respectively, against the biasing forces of the coil springs 38a, 38b. When the cover 16 is fully displaced downwardly closing the chamber 12 in the casing 14, the fingers 40a, 40b snap into engagement with the side wall 20a. The cover 16 is now locked in place by the lock means 34a, 34b. The cassette 10 is then removed from the cassette holder 52 and loaded into the radiation image recording device in which a new radiation image is recorded on the stimulable phosphor sheet S by exposure.

Since the leaf spring 30 is disposed in the casing 14 for engaging and automatically pushing the stimulable phosphor sheet S out of the casing 14 when the cover 16 is opened, the reading device 50 in which the cassette 10 is loaded is not required to have a complex sheet feed mechanism which would otherwise be necessary.

More specifically, as described above, by opening the cover 16 with the suction cup 56, the leaf spring 30 is released of the pressing forces from the cover 16 and is curved upwardly under its own resiliency. Therefore, the stimulable phosphor sheet S placed on the leaf spring 30 is obliquely displaced or pushed upwardly with its end near the side wall 20a being elevated. Then, the roller pair 62 is displaced toward the stimulable phosphor sheet S thereby to easily grip the end of the stimulable phoshpor sheet S which projects upwardly from the casing 14. The rollers of the roller pair 62 are thereafter rotated to deliver the stimulable phosphor sheet S toward the first feed means 66.

With the above arrangement, therefore, it is not necessary to employ a sheet feed mechanism including both a suction cup for attracting a stimulable phosphor sheet and a link mechanism or the like for displacing the suction cup along a desired path. Inasmuch as a large, complex, and highly costly sheet feed mechanism is not required, the cost of manufacture of the reading device 50 can be lowered, and the size of the reading device 50 can be reduced.

Figure 5:
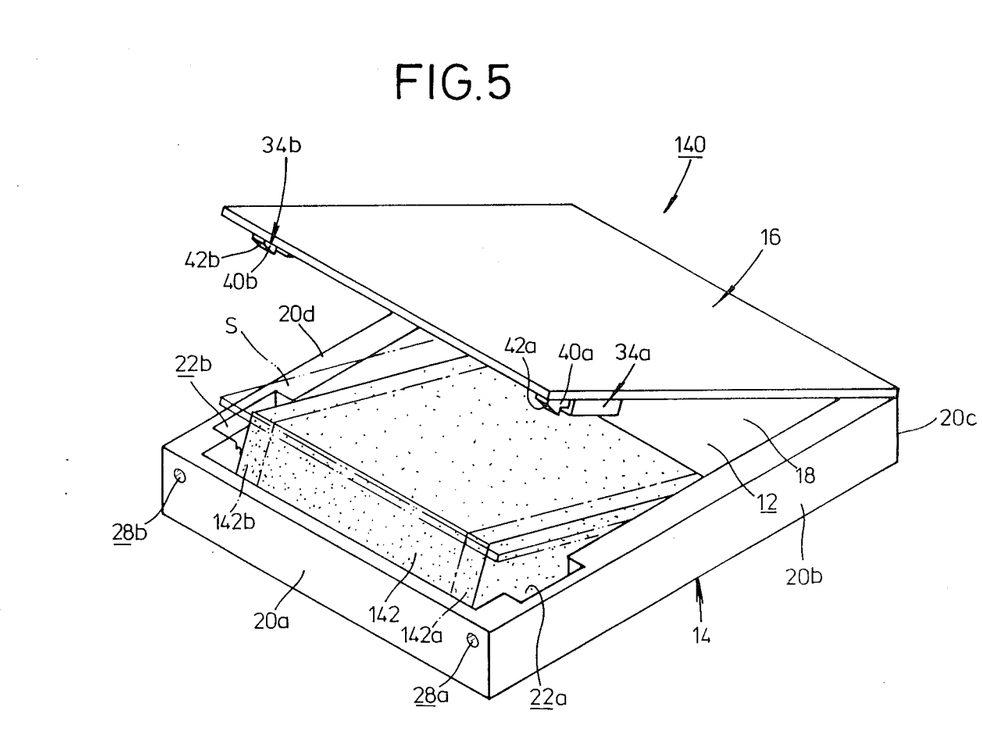
FIG. 5 is a perspective view of a cassette for an information recording medium according to another embodiment of the present invention.

A cassette according to another embodiment is illustrated in FIG. 5. Those parts shown in FIG. 5 which are identical to those of FIG. 1 are denoted by identical reference numerals, and will not be described in detail.

A cassette 120 according to this embodiment includes a block 142 of soft sponge rubber in place of the leaf spring 30 of the previous embodiment. The rubber block 142 is substantially in the shape of a triangular prism disposed in the casing 14 near and parallel to the side wall 20a, the rubber block 142 being fixed to the bottom wall 18. The rubber block 142 may be of any of various other shapes and sizes. For example, two narrow blocks 142a, 142b of sponge rubber may be disposed near the side walls 20a, 20b, respectively, as indicated by the dot-and-dash lines in FIG. 5.

The cassette 140 thus constructed operates in the same manner and offers the same advantages as the cassette 10 shwon in FIG. 1.

More specifically, when the cover 16 is locked on the casing 14 by the lock means 34a, 34b, the rubber block 142 is pressed downwardly and confined in the chamber 12 in the casing 14 by the cover 16. When the cover 14 is opened in the reading device 50, the rubber block 142 resiliently returns its undeformed shape free of external forces, lifting the stimulable phosphor sheet S placed thereon to its an inclined position with its end near the side wall 20a being in an upper position. Then, the roller pair 62 is displaced toward the cassette 140 to grip the upper end of the stimulable phosphor sheet S for delivery toward the first feed means 62.

Figure 6:
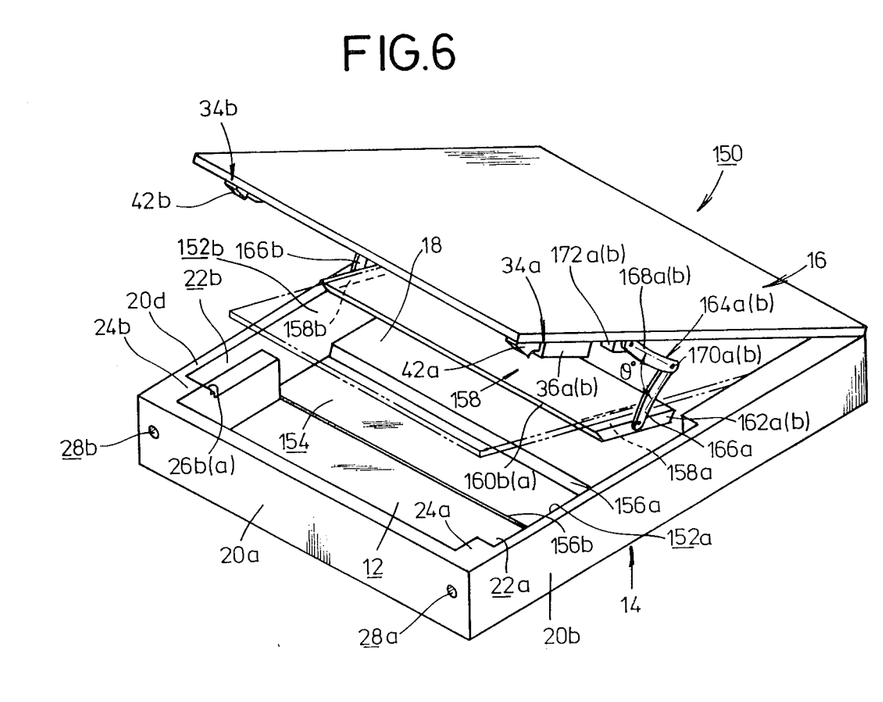
FIG. 6 is a perspective view of a cassette for an information recording medium according to still another embodiment of the present invention.
Figure 7:
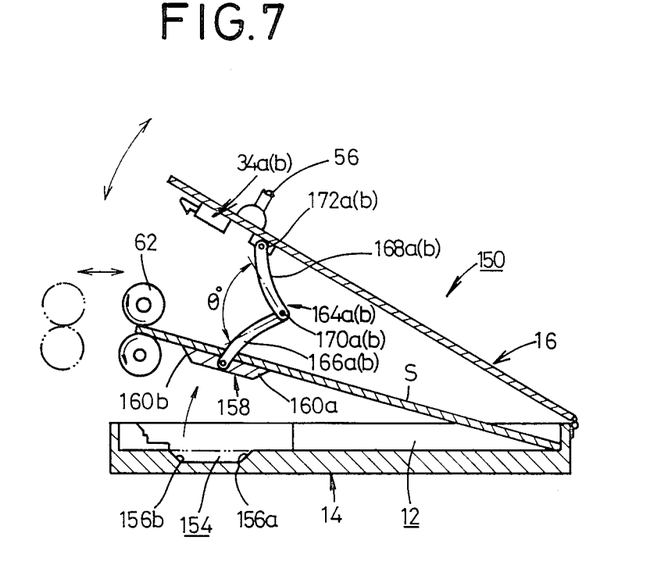
FIG. 7 is a vertical cross-sectional view showing the manner in which a sheet is taken out of the cassette illustrated in FIG. 6.

FIGS. 6 and 7 show a cassette according to still another embodiment. Those parts shown in FIGS. 6 and 7 which are identical to those of FIG. 1 are denoted by identical reference numerals, and will not be described in detail.

A cassette 150 according to this embodiment has cavities 152a, 152b defined respectively in the inner surfaces of the side walls 20b, 20d of the casing 14 and having ends communicating with the recesses 22a, 22b, respectively. The bottom wall 18 has a recess 154 defined in its upper surface near the side wall 20a and extending parallel thereto. The recess 154 is defined between two opposite longitudinal side edges 156a, 156b which are slanted progressively away from each other in the direction toward the cover 16 (see FIG. 7).

A sheet lifter 158 is normally fitted in the recess 154. The sheet lifter 158 is of a substantially trapezoidal cross section having two opposite longitudinal side edges 160a, 160b slanted in complementary relation to the slanted side edges 156a, 156b. The sheet lifter 158 has a thickness selected such that when it is fitted in the recess 154, the upper flat surface of the sheet lifter 158 lies flush with the upper flat surface of the bottom wall 18. The length of the sheet lifter 158 in its longitudinal direction is smaller than the distance between the side walls 20b, 20d. Coupling means 164a, 164b are operatively connected between the cover 160 and the longitudinal opposite ends of the sheet lifter 158.

The coupling means 164a includes a pair of links 166a, 168a which are pivotally joined to each other by a pin 170a. When the links 166a, 168a are angularly moved away from each other as shown, they are angularly spaced from each other by an angle $\theta$ which is smaller than 180°, preferably in the range of from 30° to 120°. The link 166a is swingably coupled to the end face 162a of the sheet lifter 158, whereas the other link 168a is pivotally connected to the inner surface of the cover 16 by an attachment 172a.

The coupling means 168a is of the same construction as that of the coupling means 166a. Those parts of the coupling means 168a which are identical to those of the coupling means 166a are designated by identical reference numerals with a suffix b.

As an alternative, the sheet lifter 158 may be replaced with a pair of narrow sheet lifters 158a, 158b, as indicated by the broken lines in FIG. 6, and narrow recesses may be defined in the bottom wall 18 near the side walls 20b, 20d, respectively, for receiving the sheet lifters 158a, 158b, respectively.

The cassette 150 can be loaded into the radiation image information reading device 50 in the same manner as the cassette 10 is loaded as described above.

The stimulable phosphor sheet S stored in the cassette 150 is placed on the sheet lifter 158 that is joined to the cover 15 by the coupling means 164a, 164b. The stimulable phosphor sheet S can easily be taken out of the cassette 150 without requiring any complex sheet feed mechanism.

More specifically, by opening the cover 16 with the suction cup 56, as shown in FIG. 7, the sheet lifter 158 connected to the cover 16 by the coupling means 164a, 164b is displaced upwardly out of the recess 154 in the bottom wall 18. Therefore, the stimulable phosphor sheet S on the sheet lifter 158 is obliquely elevated with its end near the side wall 20a being positioned upwardly. Since the upper end of the stimulable phosphor sheet S projects outwardly from the casing 14, it can easily be gripped by the roller pair 62 by displacing the roller pair 62 toward the stimulable phosphor sheet S.

The rollers of the roller pair 62 are then rotated about their own axes to feed the stimulable phosphor sheet S toward the first feed means 66.

Therefore, in response to opening movement of the cover 16, the stimulable phosphor sheet S is inclined out of the casssette 150 to position its end upwardly for being gripped by the roller pair 62. As a result, any large-size and costly sheet feed mechanism in which a suction cup connected to a vacuum generator is required to move along a desired path with a link mechanism or the like is not necessary.

The sheet lifter 158 has the slanted surfaces 160a, 160b, as described above. Consequently, when the radiation-image of a desired object is recorded on the stimulable phosphor sheet S in the cassette 150 in a radiation image recording device or the like, the surfaces of the bottom wall 18 and the sheet lifter 158 which are held against each other are inclined with respect to the direction in which the radiation is applied to the stimulable phosphor sheet S. As a result, the radiation image recorded on the stimulable phosphor sheet S is free of image irregularities. The process of recording radiation image information can thus be carried out effectively.

With the present invention, as described above, the cover is openably and closably mounted on the casing which stores an image recording medium such as a stimulable phosphor sheet, and the resilient member is disposed in the casing for placing the image recording medium thereon. Accorindingly, simply by loading the cassette into the image reading device or the like and opening the cover, the image recording medium can automatically be brought into a position facing the sheet feed system under the resiliency of the resilient member. As a consequence, the image recording medium can automatically and easily be delivered into the sheet feed system without requiring a conventional large-size and expensive sheet feed mechanism which would make complex movement. The device in which the cassette is loaded can be manufactured economically, and can be made small in size effectively.

Moreover, the cover is openably and closably mounted on the casing which stores an image recording medium such as a stimulable phosphor sheet, and the sheet lifter serving as an inner wall portion of the casing is operatively coupled to the cover. Accorindingly, simply by loading the cassette into the image reading device or the like and opening the cover, the sheet lifter is displaced from the casing in response to opening movement of the cover to bring the image recording medium on the sheet lifter into a position facing the sheet feed system. As a consequence, the device in which the cassette is loaded can be simplified in structure and manufactured economically, and can be of a small size.

The principles of the present invention are not limited to the embodiments described above, but are also applicable to a cassette for storing and loading an ordinary X-ray film into a developing device.

Although certain preferred embodiments have been shown and described, it should be understood that many changes and modifications may be made therein without departing from the scope of the appended claims.

What is claimed is:

1. A cassette for storing an image recording medium, comprising:

a casing for housing the image recording medium therein;

a cover openably and closably mounted on said casing for holding the image recording medium in a light-shielding manner in said casing; and a resilient member disposed in said casing for placing the image recording medium thereon, said recording medium being solely supported by said resilient member, the arrangement being such that when said cover is opened in a device having a sheet feed system, the image recording medium can be brought under resiliency of said resilient member into a position facing the sheet feed system with one end of said recording medium being accessible to said sheet feed system such that said recording medium can be conveyed the casing by said sheet conveyance system.

2. A cassette according to claim 1, wherein said cover has lock means detachably engageable with said casing for locking said cover on said casing.

3. A cassette according to claim 1, wherein said resilient member comprises a leaf spring having a curved or bent portion directed toward said cover and a linear portion, the recording medium being supported on said linear portion.

4. A cassette according to claim 3, wherein said curved or bent portion of said leaf spring is positioned near a portion of said casing from which said image recording member will be fed out of the casing.

5. A cassette according to claim 1, wherein said resilient member comprises a resilient sponge body.

6. A cassette according to claim 5, wherein said resilient sponge body has an end projecting toward said cover and positioned near a portion of said casing from which said image recording member will be fed out of the casing.

7. A cassette as claimed in claim 1 wherein said image recording medium is a stimulable phosphor sheet.

8. A cassette for storing an image recording medium, comprising:

a casing for housing the image recording medium therein;

a cover openably and closably mounted on said casing for holding the image recording medium in a light-shielding manner in said casing; and a lifter disposed in said casing for placing the image recording medium thereon, said lifter being operatively coupled to said cover by coupling means, the arrangement being such that when said cover is opened in a device having a sheet feed system, the lifter is displaced from said casing through said coupling means to bring the image recording medium on said lifter into a position facing the sheet feed system by which the image recording medium can be fed out of the casing.

9. A cassette according to claim 8, wherein said cover has lock means detachably engageable with said casing for locking said cover on said casing.

10. A cassette according to claim 8, wherein said coupling means comprises a pair of pivotally connected links, one of said links being joined to said cover and the other link to said lifter.

11. A cassette according to claim 10, wherein said links are angularly spaced from each other by an angle ranging from 30° to 120° when the links are angularly moved away from each other.

12. A cassette according to claim 8, wherein said lifter is spaced from a portion of said casing from which said image recording member will be fed out of the casing, such that when said lifter is displaced from said casing by opening said cover, an end of the image recording medium on said lifter projects outwardly from said lifter so as to face the sheet feed system.

13. A cassette according to claim 8, wherein said casing has a recess defined in an inner surface thereof near a portion of the casing from which said image recording member will be fed out of the casing, said recess extending transversely to a direction in which said image recording member will be fed out of the casing, said lifter being fittable in said recess when said cover is closed.

14. A cassette according to claim 13, wherein said lifter and said inner surface of said casing lie flush with each other when said lifter is fitted in said recess.

15. A cassette according to claim 13 or 14, wherein said lifter has opposite edges extending transversely of said direction and slanted progressively toward each other in a direction away from said cover.

16. A cassette as claimed in claim 8 wherein said image recording medium is a stimulable phosphor sheet.

* * * * *